Oct. 31, 1939.  C. E. KERR  2,177,988
CORN HUSKER
Filed Oct. 2, 1937
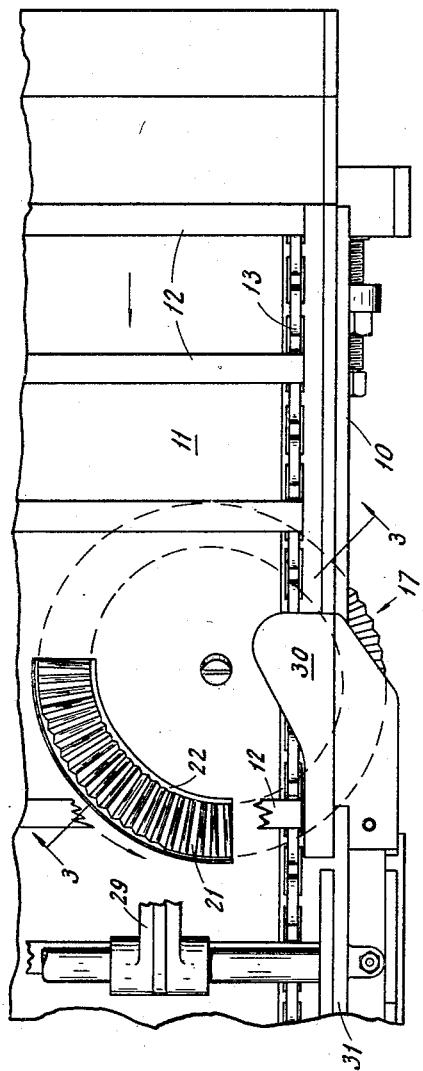
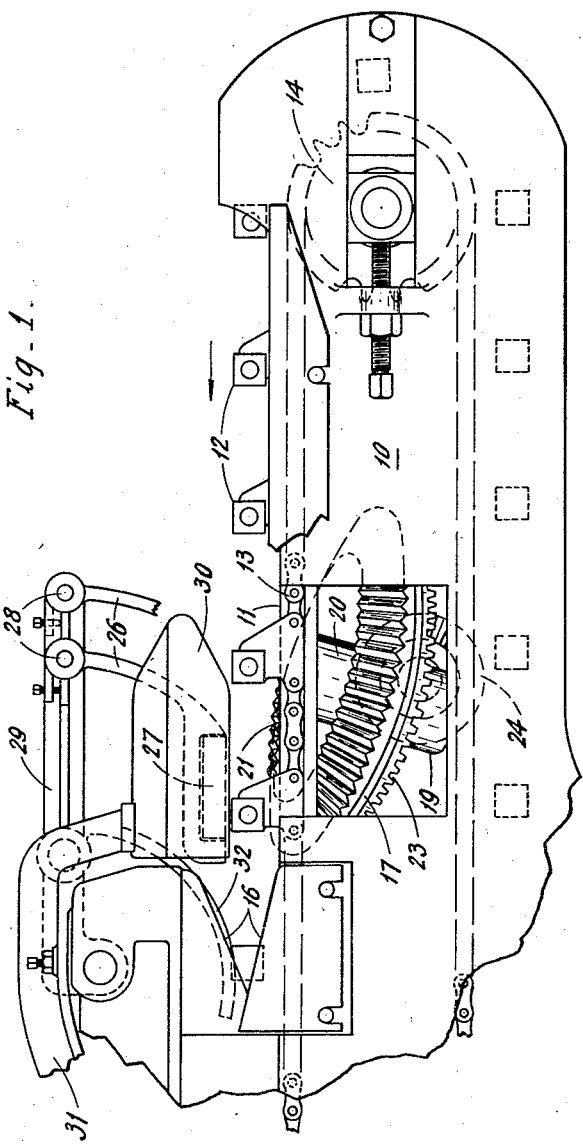
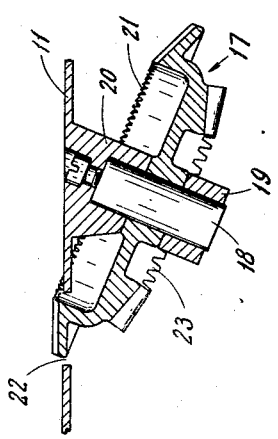
INVENTOR.
Charles E. Kerr.
BY Philip A. Minnis
ATTORNEY.

Patented Oct. 31, 1939

2,177,988

UNITED STATES PATENT OFFICE 2,177,988

CORN HUSKER

Charles E. Kerr, Hoopeston, Ill., assignor to Food Machinery Corporation, San Jose, Calif., a corporation of California Application October 2, 1937, Serial No. 166,990

7 Claims. (Cl. 146—84)

This invention relates to corn huskers or the like employing ear debutting means and is concerned more particularly with the provision of improved means for positioning the ears of corn for the debutting operation.

It is a general object of the invention to provide improved means for feeding ears of corn to the debutting means of a corn husker or the like.

Another object of the invention is to provide a corn husker or the like embodying a simple and efficient positioning means for moving ears of corn into alignment with debutting means therefor.

Other objects of the invention will appear from the following description of a preferred embodiment thereof as illustrated in the accompanying drawing, in which:

Fig. 1 is a fragmentary plan view of the feed end of a corn husker embodying my invention.

Fig. 2 is a fragmentary side elevation of the feed end of the corn husker.

Fig. 3 is a fragmentary sectional view through the positioning means for the ears of corn, and is taken in the plane of the line 3—3 in Fig. 1.

In corn husking machines, the first operation is usually that of cutting off the butt end of the ears of corn, and for this purpose the corn huskers are provided with conveying means to which the ears of corn are fed by an operator, so that the conveying means will carry the ears of corn past debutting means for cutting off the butt ends thereof and then to the corn husking mechanism of the machine. In order to have the proper amount cut off the butt end of each ear of corn, positioning means are provided for moving the ears of corn butt end first against a gauge into properly aligned relation with respect to the debutting means, and the provision of an improved ear positioning means which is simple and inexpensive to build and which will operate efficiently, is the purpose of the instant invention.

Only a portion of the corn husker is disclosed and for a disclosure of the parts of the machine not important to the instant invention, reference is made to Patent No. 1,927,957 issued to O. S. Sells et al., on September 26, 1933.

Referring to Figs. 1 and 2, the husker includes a body 10 having a bed plate or table 11 over which the ears of corn are carried by a conveyor including transverse pusher bars 12 extending between a pair of conveyor chains 13, only one of which is seen in the drawing. Each chain 13 travels in a suitable track in the table 11 and may be trained about suitable sprockets 14 which are driven in a suitable manner to carry the bars 12 in the direction of the arrows in Figs. 1 and 2. The bars 12 are sufficiently wide in most machines to carry two files of corn ears, but as the mechanisms associated with the two files of ears are similar, only one of such mechanisms is disclosed herein. The ears of corn are placed by the operator on the table 11, between adjacent pusher bars 12 with their butt ends toward the chain 13 so that they are pushed or rolled along the bed plate 11 toward the debutting means which may comprise a pair of opposed knives 16 which have their cutting edges forming a V-shaped opening to receive and slice off the butt ends of the ears of corn.

In order to insure that all ears of corn, irrespective of their varying lengths and diameters, will be cut off at the proper place, ear positioning means are provided including means for moving the ears of corn toward the adjacent chain 13, and means for holding the ears of corn in engagement with such moving means. The moving means comprises a gear or ring member 17 (Figs. 1, 2 and 3) which has its hub journalled on a stub shaft 18 (Fig. 3) between collar 19 and boss 20, in which the shaft 18 is secured by a suitable fastening screw. The boss 20 is preferably formed integrally with the table 11 and is disposed to support the shaft 18 in angled relation with respect to the table 11, the angle being such that the frusto-conical toothed rim or surface 21 of the gear at its highest portion extends slightly above the plane of the table 11 through an arcuate aperture 22 formed therein to provide a ribbed ear engaging surface. The gear 17 is rotated in the direction of the arrow in Fig. 1, through gear teeth 23 formed on the lower face thereof by a bevel gear 24, shown diagrammatically in Fig. 2, which is driven from a suitable source of power.

The aperture 22 as seen most clearly in Fig. 1 is preferably of a length so that substantially one-fifth of the toothed surface will project above the table 11, and is located so that the emerging teeth 21 are travelling substantially in the same direction as the bars 12, and as the teeth pass beneath the table 11, the teeth are travelling substantially toward the debutting means, and at substantially a right angle to the path of travel of the bars 12 and the ears of corn propelled thereby.

In order to maintain the ears in engagement with the gear surface 21, a pair of similar parallel presser arms 26 carrying similar rollers 27 are pivotally mounted as at 28 on a bracket 29 to ride in floating engagement with the ears of corn while presenting no resistance to the endwise travel thereof effected by the gear 17 which serves to move the ears transversely of their direction of travel into engagement with a gauge or stop 30 suitably mounted at the end of a bracket 31 in front of the debutting knives 16. The gauge 30 is so related to the knives 16 that when the butt ends of ears of corn are engaged therewith, they are in proper alignment for the debutting operation which is effected by the knives 16, while the ears of corn are being carried under and held in place by an arcuate resilient presser arm 32 in transverse alignment with the knives 16.

While I have shown and described a preferred embodiment of the invention, it will be understood that the invention is capable of both modification and variation by those skilled in the art, and the scope of my invention, therefore, should be limited only by the scope of the appended claims.

I claim:

1. In a corn husker, ear debutting means, a conveyor for moving ears of corn past said debutting means with said ears travelling transversely of their length, and means for moving the ears in the direction of their length comprising a gear journalled for rotation about an inclined axis and having a frusto-conical face cooperatively related to said conveyor for engagement with the ears of corn engaged with said conveyor to move the ears toward said debutting means.

2. In a corn husker, ear debutting means, means for conveying a file of ears of corn sidewise past said debutting means, a rotatable corrugated ring cooperatively related to said conveyor projecting partially up into the path of said file for moving the ears endwise toward said debutting means, and means for rotating said ring.

3. In a corn husker, ear debutting means, means for conveying a file of ears of corn sidewise past said debutting means, and a rotatable gear projecting partially up into the path of said file for moving the ears endwise toward said debutting means, said projecting gear portion having components of motion both sidewise and endwise relative to the ears of corn.

4. In a corn husker, ear debutting means, means for conveying a file of ears of corn sidewise past said debutting means, and a rotatable corrugated ring projecting partially up into the path of said file, for moving the ears endwise toward said debutting means, said projecting ring portion having components of motion both sidewise and endwise relative to the ears of corn.

5. In a corn husker, a table, ear debutting means, a conveyor for carrying ears of corn over said table toward said debutting means, a gauge for aligning ears of corn relative to said debutting means, and a gear mounted beneath said table in transverse alignment with said gauge and having an annular toothed surface projecting through an aperture in said table for a part of its periphery, the emerging portion of said toothed surface moving substantially in line with the direction of travel of said conveyor, and the disappearing portion of said toothed surface moving substantially at right angles to said direction of movement.

6. In a corn husker, a table, ear debutting means, a conveyor having transverse flights for carrying ears of corn over said table toward said debutting means, a gauge for aligning ears of corn relative to said debutting means, and a gear mounted beneath said table and having an annular toothed surface projecting through an aperture in said table for a part of its periphery, said projecting part of said toothed surface lying in the path of corn engaged with said conveyor and having its concave side facing and symmetrically disposed relative to said gauge and an active approaching flight of said conveyor.

7. In a corn husker, a table, ear debutting means at a side of said table, a conveyor having transverse flights movable over said table to carry ears of corn past said debutting means, a gauge mounted at said side of said table to provide a stop for positioning ears of corn relative to said debutting means, a segmental arcuate aperture in said table located in substantial transverse alignment with said gauge, a gear journalled below said table about an inclined axis adjacent said aperture and having a frusto-conical corrugated face projecting through said aperture for engagement with ears of corn entrained with said conveyor.

CHARLES E. KERR.